United States Patent
Chang

(10) Patent No.: US 10,092,964 B2
(45) Date of Patent: Oct. 9, 2018

(54) ASSEMBLY-TYPE CUTTER

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 345 days.

(21) Appl. No.: 14/983,855

(22) Filed: Dec. 30, 2015

(65) Prior Publication Data

US 2017/0014917 A1 Jan. 19, 2017

(30) Foreign Application Priority Data

Jul. 13, 2015 (TW) .................. 104122465

(51) Int. Cl.
| | |
|---|---|
| *B23C 5/10* | (2006.01) |
| *B23B 31/00* | (2006.01) |
| *B23B 31/11* | (2006.01) |
| *B23B 51/04* | (2006.01) |

(52) U.S. Cl.
CPC ............ *B23C 5/109* (2013.01); *B23B 31/005* (2013.01); *B23B 31/1115* (2013.01); *B23B 51/048* (2013.01); *B23C 5/10* (2013.01); *B23B 2228/24* (2013.01); *B23B 2231/0204* (2013.01); *B23B 2251/02* (2013.01); *B23B 2260/138* (2013.01); *B23C 2210/02* (2013.01); *B23C 2210/03* (2013.01); *B23C 2228/24* (2013.01); *B23C 2240/32* (2013.01)

(58) Field of Classification Search
CPC ........ B23B 2231/0204; B23B 2251/02; B23B 2260/138; B23B 31/1115; B23B 51/048; B23B 31/005; B23B 2228/24; B23C 2210/02; B23C 2240/32; B23C 5/10; B23C 5/109; B23C 2210/03; B23C 2228/24

USPC .................................... 411/426, 411
See application file for complete search history.

(56) References Cited

U.S. PATENT DOCUMENTS

| | | | | |
|---|---|---|---|---|
| 1,407,335 A | * | 2/1922 | Reynolds ............ | B23B 31/1107 279/100 |
| 2,328,602 A | * | 9/1943 | Bechler ............... | B23B 31/1107 403/333 |
| 3,047,316 A | * | 7/1962 | Wehring ............... | E21B 17/042 285/334 |
| 3,586,353 A | * | 6/1971 | Lorenz .................. | E21B 17/042 285/334 |
| 3,643,722 A | * | 2/1972 | Oestereicher .......... | F16B 39/30 411/334 |
| 3,752,030 A | * | 8/1973 | Steurer ............... | F16B 25/0021 411/411 |

(Continued)

FOREIGN PATENT DOCUMENTS

DE 3120219 A1 * 1/1983 ........... B23B 51/048

*Primary Examiner* — Sara Addisu
(74) *Attorney, Agent, or Firm* — Rosenberg, Klein & Lee

(57) ABSTRACT

An assembly-type cutter includes a shank and a cutter head. The shank has a hole at one end. The hole has a receiving portion, which includes an internal thread and can be treated thermally for increased rigidity. The cutter head has a cutting portion and a connecting portion at opposite ends respectively. The connecting portion includes a threaded member and can also be treated thermally for increased rigidity. The cutter head and the shank are threadedly connectable via the connecting portion and the receiving portion. The threaded member includes a body portion, whose diameter is defined as a root diameter, and an external thread on the body portion. The body portion is slightly tapered such that a locus of the root diameter is inclined.

7 Claims, 7 Drawing Sheets

(56) References Cited

U.S. PATENT DOCUMENTS

| | | | | |
|---|---|---|---|---|
| 3,848,506 A | * | 11/1974 | Zifferer | F16B 13/124 411/17 |
| 3,864,806 A | * | 2/1975 | Hanson | F16B 37/122 29/402.17 |
| 4,040,328 A | * | 8/1977 | Muenchinger | B21H 3/027 411/412 |
| 4,069,730 A | * | 1/1978 | Gutshall | F16B 25/0021 411/386 |
| 4,102,036 A | * | 7/1978 | Salter | F16B 5/02 29/525 |
| 4,235,149 A | * | 11/1980 | Veldman | B21H 3/027 411/417 |
| 4,315,340 A | * | 2/1982 | Veldman | B21H 3/02 411/416 |
| 4,489,963 A | * | 12/1984 | Raulins | E21B 17/042 285/332.3 |
| 4,611,838 A | * | 9/1986 | Heilmann | E21B 17/042 285/331 |
| 4,735,537 A | * | 4/1988 | Rath | B21H 3/06 411/411 |
| 4,828,294 A | * | 5/1989 | Bounie | F16L 15/002 264/162 |
| 4,981,406 A | * | 1/1991 | Weiss | F16B 35/047 411/386 |
| 5,114,286 A | * | 5/1992 | Calkins | B23B 31/11 408/226 |
| 5,205,679 A | * | 4/1993 | Nagata | B23F 21/026 407/23 |
| RE34,256 E | * | 5/1993 | Strand | B23B 31/1107 279/8 |
| 5,222,772 A | * | 6/1993 | McGraw | F16B 7/0426 285/243 |
| 5,242,253 A | * | 9/1993 | Fulmer | F16B 35/002 411/386 |
| 5,496,137 A | * | 3/1996 | Ochayon | B22F 5/06 408/226 |
| 5,522,624 A | * | 6/1996 | Edin | F16L 15/001 285/334 |
| 5,899,642 A | * | 5/1999 | Berglow | B23B 31/11 279/8 |
| 5,971,670 A | * | 10/1999 | Pantzar | B23B 31/1107 407/119 |
| 6,030,004 A | * | 2/2000 | Schock | E21B 17/042 285/333 |
| 6,077,013 A | * | 6/2000 | Yamamoto | F16B 35/041 411/386 |
| 6,146,060 A | * | 11/2000 | Rydberg | B23B 27/08 407/101 |
| 6,394,711 B1 | * | 5/2002 | Brosius | B23C 5/10 279/8 |
| 6,565,291 B2 | * | 5/2003 | Harpaz | B23B 31/11 407/30 |
| 7,073,797 B2 | * | 7/2006 | Gaul | B23B 31/1107 175/403 |
| 7,513,724 B2 | * | 4/2009 | Kakai | B23B 31/11 279/8 |
| 2001/0041089 A1 | * | 11/2001 | Hecht | B23B 31/11 403/343 |
| 2002/0006315 A1 | * | 1/2002 | Harpaz | B23B 31/11 407/30 |
| 2002/0021945 A1 | * | 2/2002 | Harpaz | B23B 31/11 407/53 |
| 2002/0081164 A1 | * | 6/2002 | Pokolm | B23B 31/005 407/30 |
| 2002/0100133 A1 | * | 8/2002 | Kiefer | B08B 1/00 15/104.001 |
| 2003/0147707 A1 | * | 8/2003 | Perkowski | B23B 29/022 407/30 |
| 2003/0210963 A1 | * | 11/2003 | Kakai | B23B 31/008 408/231 |
| 2004/0022594 A1 | * | 2/2004 | Hecht | B23B 31/008 408/231 |
| 2006/0062642 A1 | * | 3/2006 | Jonsson | B23B 31/11 408/233 |
| 2006/0072977 A1 | * | 4/2006 | Jonsson | B23B 31/1107 408/233 |
| 2006/0073744 A1 | * | 4/2006 | Jonsson | B23B 31/11 439/884 |
| 2006/0208556 A1 | * | 9/2006 | Eriksson | B23B 31/1071 299/107 |
| 2007/0248421 A1 | * | 10/2007 | Kakai | B23B 31/1107 407/34 |

* cited by examiner

ASSEMBLY-TYPE CUTTER

FIELD OF THE INVENTION

The present invention relates to an assembly-type cutter and more particularly to a cutter structure composed of a shank and a cutter head assembled together.

BACKGROUND OF THE INVENTION

In order to enhance the functionality of a disposable cutter, it is not uncommon to integrate the functions of boring cutters, drill bits, and end mills into a single structure in which a shank can be selectively assembled with a variety of replaceable cutter heads to form different cutting tools. FIG. 6 and FIG. 7 show a conventional multifunctional cutter consisting of a shank 40 and a cutter head 50. The shank 40 is provided with a receiving portion 41 at one end, wherein the receiving portion 41 is a structure with an annular hole section 411 and an internal thread 412. The cutter head 50 may be formed with a disposable milling cutter, a disposable drill bit, or a disposable boring cutter at one end, while the other end of the cutter head 50 is formed as a connecting portion 51, which is a structure with a positioning rod 511 and an external thread 512. The cutter head 50 and the shank 40 can be threadedly connected via the connecting portion 51 and the receiving portion 41 to form a cutting tool whose cutter head 50 can be replaced with those of different functions.

More specifically, the connection between the shank 40 and the cutter head 50 of the foregoing cutter entails the positioning rod 511 being positioned and supported in the annular hole section 411 and the external thread 512 being interlocked with the internal thread 412. However, as the class of fit between a common internal thread and a common external thread is typically a loose fit, the threadedly locked portions of the cutter will wobble slightly when the cutter is in a cutting operation, as explained below. Referring to FIG. 7, when milling horizontally, the milling cutter formed at one end of the cutter head 50 is subjected to a feed load F, which generates a torque M tending to rotate the cutter head 50 about a rotation center C defined by an end portion of the shank 40 (i.e., where the shank 40 is pressed against the shoulder 52 of the cutter head 50). As a result, the cutter head 50 is rotated slightly about the rotation center C in the direction of the torque M and the connecting portion 51 of the cutter head 50 consequently shifts to one side. Now that the cutter works in a rotating manner, the blade which in one moment is in the cutting state (i.e., under load) will be relaxed as soon as it enters the non-cutting state, with the feed load F acting on another blade instead. Thus, the cutter head 50 wobbles as the blades of the milling cutter take turns receiving the feed load F, and the faster the cutter rotates, the higher the wobble frequency. The wobble will, without doubt, result in a shaky cutting operation and leave shaky cutting marks on the cut surface. Moreover, the load on the main shaft of the machine tool will be increased, and cutting depth and cutting speed will be reduced, which compromises processing efficiency and yield.

SUMMARY OF THE INVENTION

The conventional multifunctional cutters use a threaded structure to connect the shank and the cutter head. The threaded structure, however, generally features a loose fit of threads such that the threadedly locked portions tend to wobble slightly when under load during operation. Such a cutter will chatter while cutting and leave shaky cuts on the cut surface. The load on the main shaft of the machine tool will also rise, making it impossible to increase cutting depth and cutting speed, let alone processing efficiency and yield.

In one aspect of the present invention, an assembly-type cutter includes a shank and a cutter head. The shank is provided with a hole at one end. The hole is provided therein with a receiving portion. The receiving portion includes an internal thread. The cutter head is provided with a cutting portion at one end and is extended with a connecting portion at the opposite end. The connecting portion includes a threaded member. The cutter head and the shank can be threadedly connected via the connecting portion and the receiving portion. The threaded member of the cutter head includes a body portion and an external thread on the body portion. The external thread of the threaded member has a major diameter defined as an outer diameter. The body portion of the threaded member has a diameter defined as a root diameter. The body portion is slightly tapered such that a locus of the root diameter has a small angle with respect to the longitudinal axis of the body portion.

Preferably, the external thread of the threaded member is also slightly tapered such that a locus of the outer diameter has a small angle with respect to the longitudinal axis of the body portion.

According to the present invention, the tight fit and interference fit between the external thread and the internal thread help increase the extent of tight radial engagement between the shank and the cutter head. When the cutter head is cutting, the feed load to which the cutter head is subjected is resisted not only by the engaged portions of the positioning rod and the annular hole section and the axially connected end surfaces of the cutter head and the shank, but also by the tightly threadedly engaged portions of the external thread and the internal thread. The cutter head, therefore, will not wobble as the cutter rotates, meaning the cutter will not chatter while cutting. This allows both cutting speed and the amount of feed to be increased to raise cutting efficiency.

DETAILED DESCRIPTION OF THE INVENTION

Figure 1:
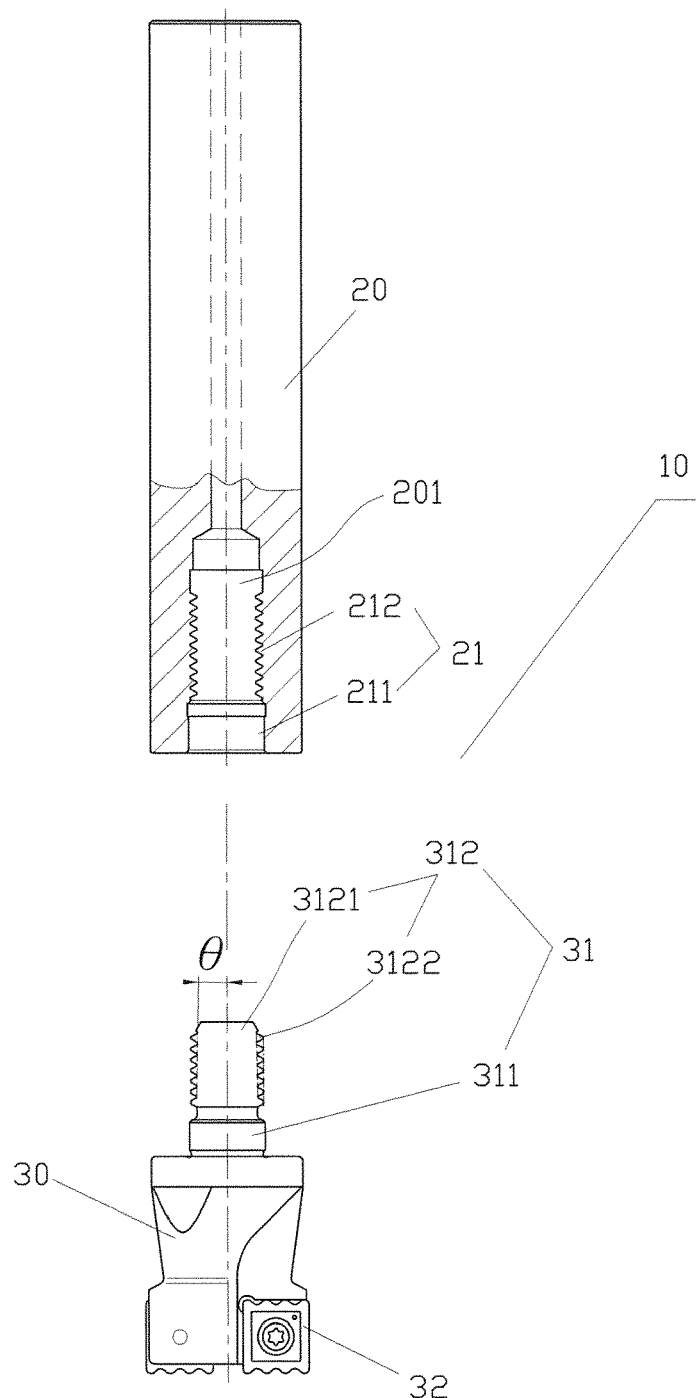
FIG. 1 is an exploded view of the shank and the cutter head in the first embodiment of the present invention.
Figure 2:
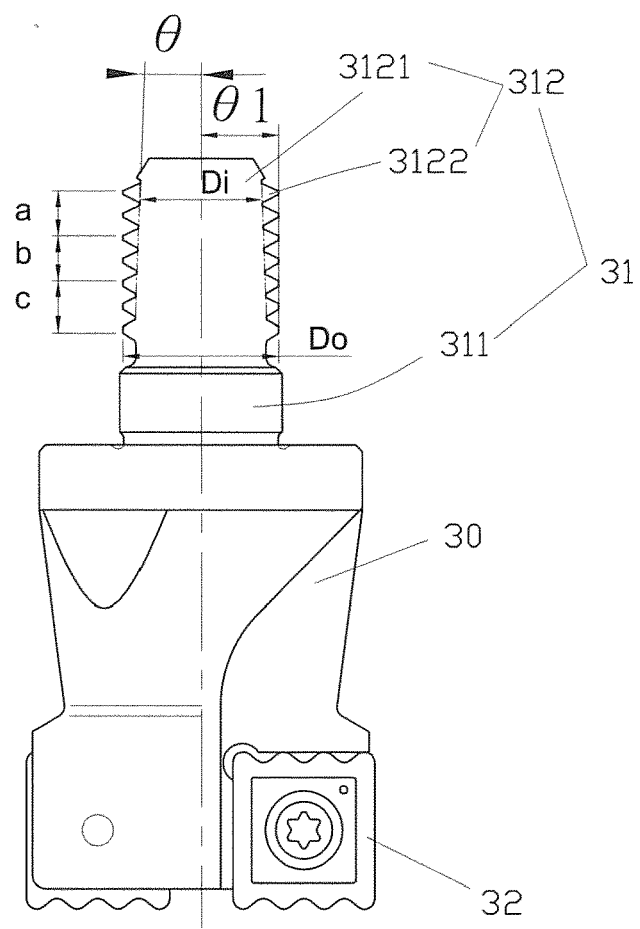
FIG. 2 is a plan view of the cutter head in the first embodiment of the present invention.
Figure 3:
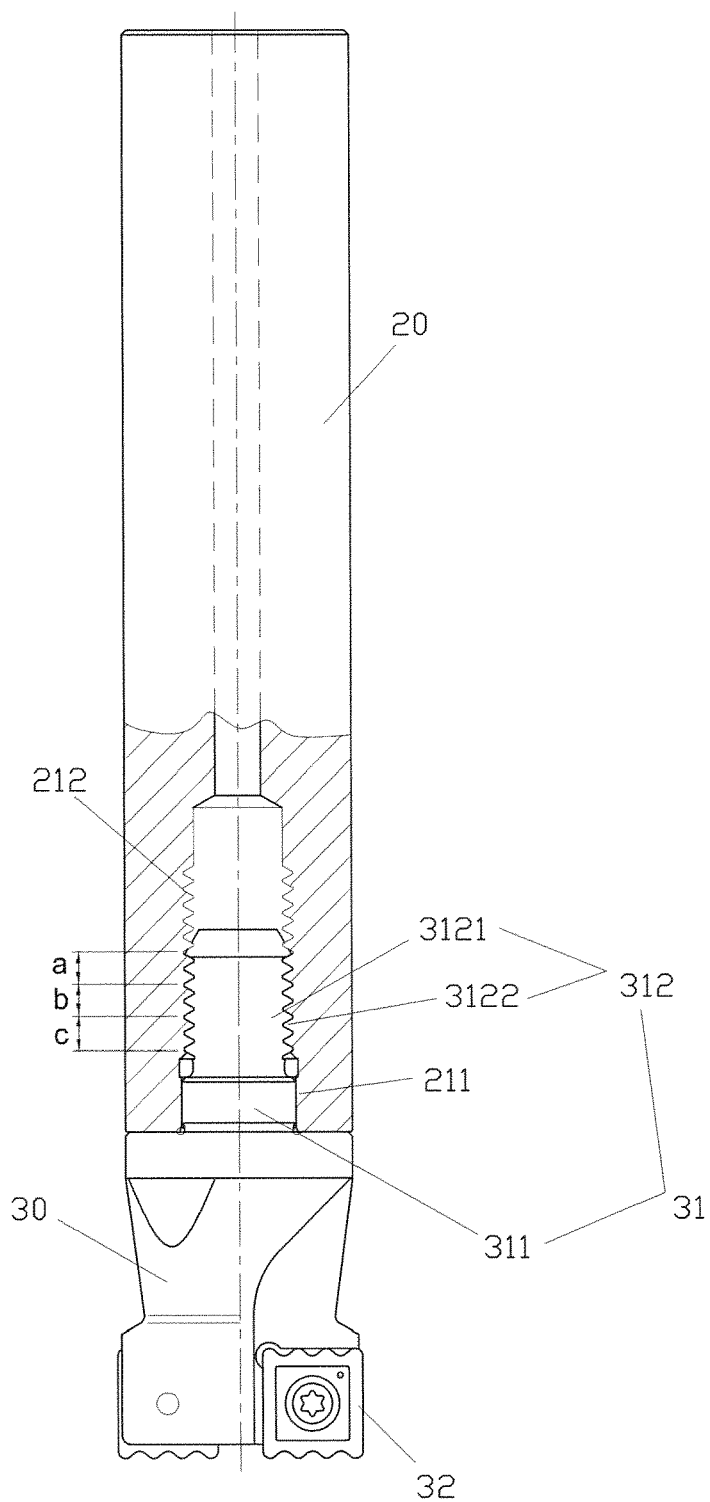
FIG. 3 is an assembled plan view of the cutter in the first embodiment of the present invention.

Referring to FIG. 1 to FIG. 3 for the first embodiment of the present invention, the cutter 10 includes a shank 20 and a cutter head 30.

The shank 20 is provided with a hole 201 at one end. The hole 201 is provided therein with a receiving portion 21. The receiving portion 21 includes an annular hole section 211 and an internal thread 212.

The cutter head 30 is provided with a cutting portion 32 (configured for milling or drilling, to name only two cutting functions for example) at one end and has a connecting portion 31 extending from the opposite end. The connecting portion 31 includes a positioning rod 311 and a threaded member 312. The cutter head 30 and the shank 20 can be threadedly connected via the connecting portion 31 and the receiving portion 21. The threaded member 312 of the connecting portion 31 includes a body portion 3121 and an external thread 3122 on the body portion 3121. The external thread 3122 of the threaded member 312 has a major diameter defined as an outer diameter Do. The body portion 3121 of the threaded member 312 has a diameter defined as a root diameter Di. The body portion 3121 is slightly tapered because it is radially enlarged along its longitudinal axis from the free end of the threaded member 312 toward the cutting portion 32 of the cutter head 30. As a result, the root diameter Di is varying and a locus of the root diameter Di defines a small angle θ with respect to the longitudinal axis of the body portion 3121, wherein the locus of the root diameter Di is a line connecting different tangent points on a tangent plane to the body portion 3121. In this embodiment, the small angle θ is 0.5°~3°. However, a locus of the outer diameter Do in this embodiment is parallel to the longitudinal axis of the body portion 3121, wherein the locus of the outer diameter Do is a line connecting different tangent points on a tangent plane to the external thread 3122.

Referring to FIG. 3, the class of fit between the positioning rod 311 of the cutter head 30 and the annular hole section 211 of the shank 20 ranges between a sliding fit and a stationary fit. Once reaching the entrance of the annular hole section 211, the positioning rod 311 can be inserted smoothly into and connected closely with the annular hole section 211 by turning the cutter head 30, thanks to the external thread 3122 and the internal thread 212. Thus, the positioning rod 311 is kept from wobbling in the annular hole section 211, and the assembled unit of the cutter head 30 and the shank 20 is enhanced in stability, meaning the cutter 10 is less likely to chatter during operation than its prior art counterparts.

The receiving portion 21 of the shank 20 and the connecting portion 31 of the cutter head 30 may receive thermal treatment to increase the rigidity of both the internal thread 212 and the external thread 3122. In this embodiment, the shank 20 is made of SKD-grade alloy tool steel, and its hardness after thermal treatment ranges from HRC40 to HRC60. The cutter head 30, on the other hand, is made of tungsten steel. The hardness of the connecting portion 31 after thermal treatment ranges from HRC25 to HRC40.

As shown in FIG. 2 and FIG. 3, the body portion 3121 of the threaded member 312 of the cutter head 30 gradually expands from the free end of the threaded member 312 toward the cutting portion 32 of the cutter head 30, and because of that, the aforesaid locus of the root diameter Di features the small angle θ, which ranges from about 0.5° to 3°. In other words, the root diameter Di increases slightly toward the positioning rod 311. The threaded member 312, therefore, can be divided into three sections of different classes of fit between threads, namely a loose-fit section a, a tight-fit section b, and an interference-fit section c. The loose-fit section a is the same as the conventional threads, falls into the loose-fit class, and is also the same as the internal thread 212 of the shank 20. Hence, the loose-fit section a o 1j4f the threaded member 312 can be easily and rapidly screwed into the internal thread 212 of the shank 20. By contrast, the user will feel greater tightness and must apply a greater torque when turning the cutter head 30 to screw in the tight-fit section b of the threaded member 312. When the user continues to screw in the interference-fit section c, even greater tightness will be felt, and therefore an even greater torque must be applied, if the cutter head 30 is turned only by hand, and yet by doing so the connecting portion 31 of the cutter head 30 still cannot be screwed completely into the shank 20. The small distance that cannot be screwed in by hand is mainly due to the fact that both the internal thread 212 and the external thread 3122 have been thermally treated, and a spanner is required to force the interference-fit section c into threaded engagement with the internal thread 212. Since the hardness of the external thread 3122 after thermal treatment is lower than that of the internal thread 212, the interference-fit section c of the threaded member 312 can deform elastically when screwed into the internal thread 212 to form a tight connection therebetween. The result is a doubly secure connection between the shank 20 and the cutter head 30 attributable not only to the positioning effect provided by fitting the positioning rod 311 of the cutter head 30 into the annular hole section 211 of the shank 20, but also to the tight fit and interference fit between the external thread 3122 and the internal thread 212. The cutter head 30 will not wobble while the shank 20 and the cutter head 30 are assembled and locked axially by the threads. Compared with the prior art, the shank 20 and the cutter head 30 are more securely locked both radially and axially.

Figure 4:
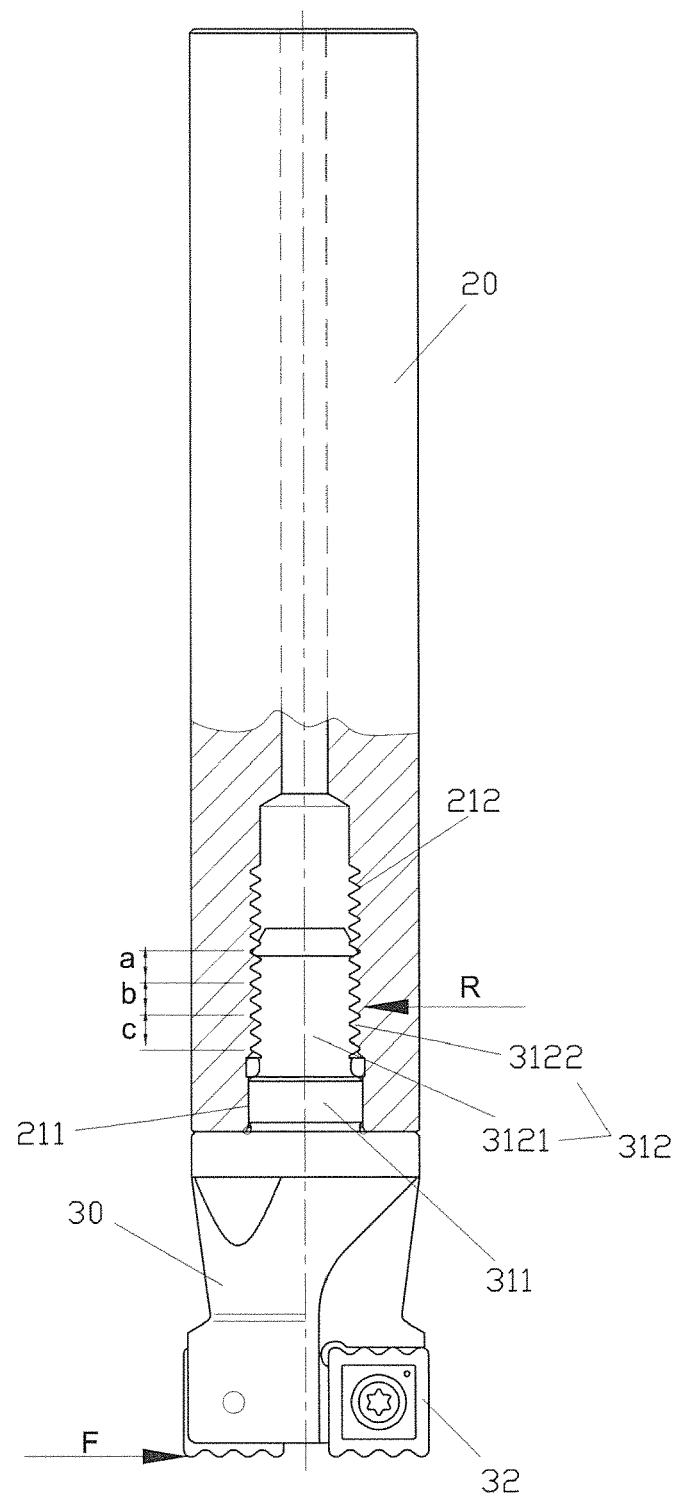
FIG. 4 schematically shows the forces acting on the cutter in the first embodiment of the present invention during a milling operation.

Reference is now made to FIG. 4. The tight fit and interference fit between the external thread 3122 and the internal thread 212 increase the extent of tight radial engagement between the shank 20 and the cutter head 30. When the cutter head 30 is subjected to the radial feed load F during a cutting operation, the tight engagement between the threadedly connected portions of the external thread 3122 and the internal thread 212 generates a reaction force R capable of resisting the feed load F in conjunction with the engaged portions of the positioning rod 311 and the annular hole section 211 and the axially connected end surfaces of the cutter head 30 and the shank 20. Therefore, when the cutter 10 is in operation (i.e., in rotation), the alternate application of force to the blades will not cause the cutter head 30 to shake, and the cutter 10 will not chatter while cutting. This will also reduce the load on the main shaft of the machine tool by about 10%, thereby increasing the cutting speed, the amount of feed, and consequently the cutting efficiency.

As the class of fit of the internal thread 212 of the shank 20 is a loose fit and the same as that of the internal threads of commercially available cutter shanks, the cutter head 30 of the present invention can work with any cutter shank on the market. This allows buyers of the cutter head 30 to cut down the expense of purchasing new cutters.

Figure 5:
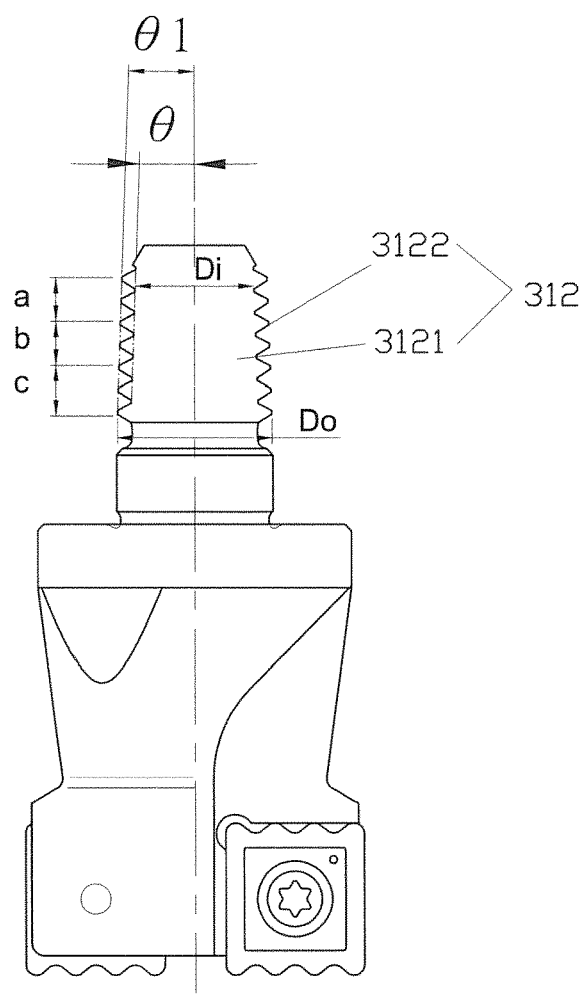
FIG. 5 shows the external thread in the second embodiment of the present invention.
Figure 6:
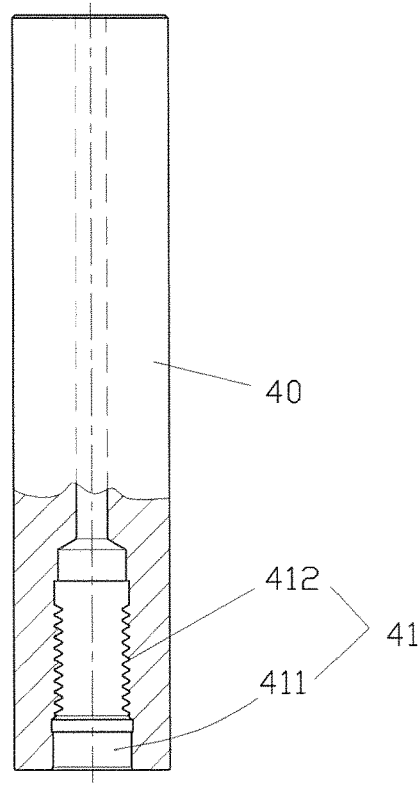
FIG. 6 is an exploded view of a conventional multifunctional cutter.
Figure 6:
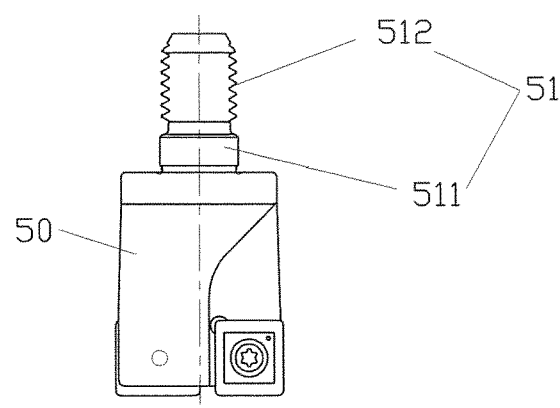
Figure 7:
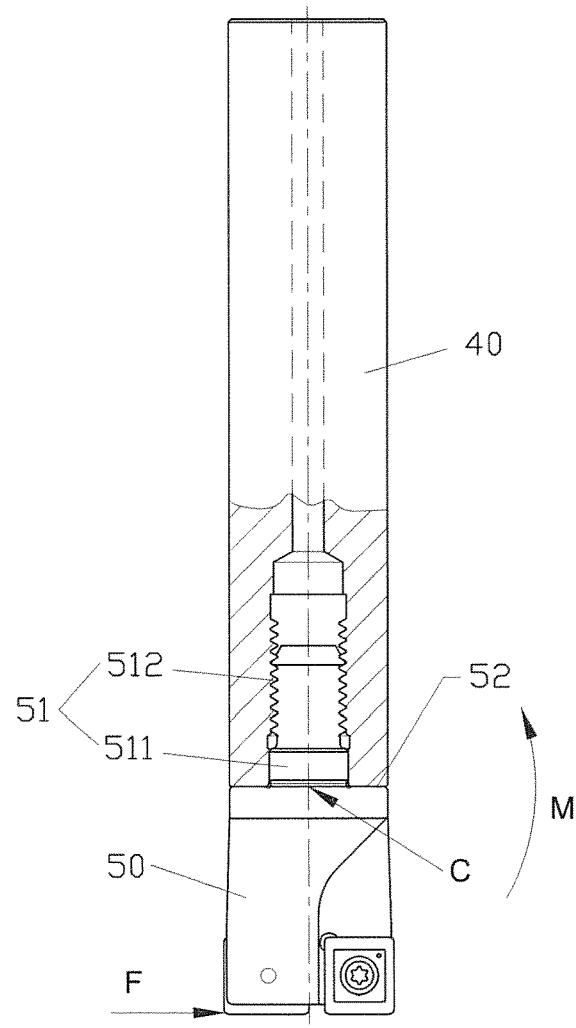
FIG. 7 is an assembled plan view of the conventional multifunctional cutter in FIG. 6.

FIG. 5 shows the second embodiment of the present invention. In this embodiment, the external thread 3122 of the threaded member 312 is also slightly tapered such that the outer diameter Do is varying and the locus of the outer diameter Do defines a small angle θ1 with respect to the longitudinal axis of the body portion 3121. Here, the small angle θ1 associated with the outer diameter Do is equal to the small angle θ associated with the root diameter Di by way of example. As in the previous embodiment, the threaded member 312 is divided into a loose-fit section a, a tight-fit section b, and an interference-fit section c in order to fit and interlock tightly with the internal thread 212 of the shank 20.

In summary of the above, the tight fit and interference fit between the external thread 3122 of the cutter head 30 and the internal thread 212 of the shank 20 increase the extent of tight radial engagement between the shank 20 and the cutter head 30. In addition, the feed load F applied to the cutter head 30 during a cutting operation is resisted not only by the engaged portions of the positioning rod 311 and the annular hole section 211 and the axially connected end surfaces of the cutter head 30 and the shank 20, but also by the tightly threadedly engaged portions of the external thread 3122 and the internal thread 212. Therefore, even though the blades of the cutter 10 will experience changes in force application as the cutter 10 rotates, the cutter head 30 will not wobble, and the cutter 10 as a whole is kept from chattering during the cutting process. The load on the main shaft of the machine tool will also be reduced by about 10%, and both cutting speed and the amount of feed can be increased to effectively raise cutting efficiency. All in all, the cutter structure disclosed herein is inventive as well as useful.

The embodiments described above are intended to enable a full understanding of the operation, use, and effects of the present invention. These embodiments, however, are only some preferred ones of the invention and should not be construed as limiting the implementation of the invention. All simple equivalent changes and modifications rooted on this specification and the appended claims should fall within the scope of the present invention.

What is claimed is:

1. An assembly-type cutter, comprising:
a shank having an end provided with a hole, the hole being provided therein with a receiving portion, the receiving portion including an internal thread; and
a cutter head having an end provided with a cutting portion and an opposite end extended with a connecting portion, the connecting portion including a threaded member so that the cutter head and the shank are threadedly connectable via the connecting portion and the receiving portion, the threaded member of the connecting portion having a body portion and an external thread on the body portion, the external thread of the threaded member having a major diameter defined as an outer diameter, the body portion of the threaded member having a diameter defined as a root diameter, the body portion being slightly tapered such that a locus of the root diameter has a small angle with respect to a longitudinal axis of the body portion, wherein the locus of the root diameter is a line connecting different tangent points on a tangent plane to the body portion, the root diameter gradually increasing from a free end of the threaded member toward the cutting portion of the cutter head such that a loose-fit section, a tight-fit section, and an interference-fit section are formed on the threaded member.

2. The assembly-type cutter of claim 1, wherein the small angle ranges from 0.5° to 3°.

3. The assembly-type cutter of claim 1, wherein the receiving portion of the shank and the connecting portion of the cutter head are treated thermally to increase rigidity of both the internal thread and the external thread.

4. The assembly-type cutter of claim 3, wherein after being treated thermally, the receiving portion of the shank has a hardness ranging from HRC40 to HRC60.

5. The assembly-type cutter of claim 3, wherein after being treated thermally, the connecting portion of the cutter head has a hardness ranging from HRC25 to HRC40.

6. The assembly-type cutter of claim 1, wherein the receiving portion includes an annular hole section, the connecting portion includes a positioning rod, and the positioning rod is engaged in the annular hole section when the connecting portion and the receiving portion are threadedly connected.

7. An assembly type cutter comprising:
a shank having an end provided with a hole, the hole being provided therein with a receiving portion, the receiving portion including an internal thread; and
a cutter head having an end provided with a cutting portion and an opposite end extended with a connecting portion, the connecting portion including a threaded member so that the cutter head and the shank are threadedly connectable via the connecting portion and the receiving portion, the threaded member of the connecting portion having a body portion and an external thread on the body portion, the external thread of the threaded member having a major diameter defined as an outer diameter, the body portion of the threaded member having a diameter defined as a root diameter, the body portion being slightly tapered such that a locus of the root diameter has a small angle with respect to a longitudinal axis of the body portion, wherein the locus of the root diameter is a line connecting different tangent points on a tangent plane to the body portion, the external thread of the threaded member being slightly tapered such that a locus of the outer diameter has a small angle with respect to the longitudinal axis of the body portion, the locus of the outer diameter being a line connecting different tangent points on a tangent plane to the external thread, the small angle associated with the outer diameter being equal to the small angle associated with the root diameter.

* * * * *